United States Patent
Thomas

(10) Patent No.: US 8,621,662 B2
(45) Date of Patent: Jan. 7, 2014

(54) ADJUSTABLE SHOULDER DEVICE FOR HARD UPPER TORSO SUIT

(75) Inventor: Kenneth S. Thomas, Manchester, CT (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 0 days.

(21) Appl. No.: 13/175,987

(22) Filed: Jul. 5, 2011

(65) Prior Publication Data

US 2012/0260387 A1    Oct. 18, 2012

Related U.S. Application Data

(60) Provisional application No. 61/474,443, filed on Apr. 12, 2011.

(51) Int. Cl.
*B64G 6/00* (2006.01)

(52) U.S. Cl.
USPC .................................. 2/2.11; 2/2.13

(58) Field of Classification Search
USPC ................. 2/2.1–2.14, 456; 138/121
See application file for complete search history.

(56) References Cited

U.S. PATENT DOCUMENTS

| | | | | |
|---|---|---|---|---|
| 2,967,305 A * | 1/1961 | Scott et al. | ...................... | 2/2.14 |
| 3,406,723 A * | 10/1968 | Cornell | ......................... | 138/121 |
| 3,492,672 A * | 2/1970 | Korabowski et al. | ............. | 2/2.13 |
| 3,564,611 A * | 2/1971 | Hardy et al. | ...................... | 2/2.13 |
| 3,628,189 A * | 12/1971 | Marroni et al. | ................... | 2/2.14 |
| 4,091,465 A * | 5/1978 | Webbon et al. | ................... | 2/2.11 |
| 4,593,415 A * | 6/1986 | Vykukal | .......................... | 2/2.12 |
| 4,598,428 A * | 7/1986 | Vykukal | .......................... | 2/2.12 |
| 4,842,224 A * | 6/1989 | Cohen | ......................... | 244/171.9 |
| 4,887,749 A | 12/1989 | Kosmo et al. | | |
| 5,068,919 A * | 12/1991 | MacKendrick et al. | ......... | 2/2.12 |
| 5,092,129 A | 3/1992 | Bayes et al. | | |
| 5,115,859 A | 5/1992 | Roebelen, Jr. et al. | | |
| 5,511,542 A | 4/1996 | Hall | | |
| 5,697,108 A | 12/1997 | Culbertson, Jr. | | |
| 6,158,050 A * | 12/2000 | MacKendrick | ................... | 2/2.12 |
| 6,256,786 B1 * | 7/2001 | Dean | ................................ | 2/2.11 |
| 6,681,589 B2 | 1/2004 | Brudnicki | | |
| 6,725,464 B2 * | 4/2004 | Humphrey | ........................ | 2/2.15 |
| 6,742,193 B2 * | 6/2004 | Graziosi et al. | ................... | 2/456 |
| 6,968,075 B1 | 11/2005 | Chang | | |

OTHER PUBLICATIONS

European Search Report for EP Application No. 12162779.8, Aug. 31, 2012.

(Continued)

*Primary Examiner* — Richale Quinn
(74) *Attorney, Agent, or Firm* — Carlson, Gaskey & Olds, P.C.

(57) ABSTRACT

A suit includes a hard upper torso providing shoulder apertures. A repositionable scye bearing is arranged at a shoulder aperture. An adjustable shoulder device interconnects the scye bearing and the hard upper torso. The adjustable shoulder device is configured to move the scye bearing between first and second shoulder width positions relative to the hard upper torso. A method of donning a suit includes the steps of adjusting a scye bearing relative to a hard upper torso to a desired shoulder width position. The scye bearing can be subsequently repositioned for desired crewmember fit and use while the desired shoulder width position is maintained.

11 Claims, 5 Drawing Sheets

(56) References Cited

OTHER PUBLICATIONS

Lerner A: "Pressurized Sleeve." NTIS Tech Notes, US Department of Commerce, Springfield, VA, US, Nov. 1, 1988, p. 994, XP000002371, ISSN: 0889-8464.

Desert Research and Technology Studies 2008 Report; Barbara Romig, Joseph Kosmo, Michael Gernhardt and Andrew Abercromby; 2009-01-2563; SAE International; 13 pages.

Continued Research in EVA, Navigation, Networking and Communication Systems; Sean Murray, David Rosenbush, Michael R. Davis, Ross Okazaki, Fred Hunter, Pavlo Rudakevych; SAE Technical Paper Series, 2008-01-2029; 38th International Conference on Environmental Systems, San Francisco, California, Jun. 29-Jul. 2, 2008; 11 pages.

Requirements and Potential for Enhanced EVA Information Interfaces; Edward Hodgson, Ronald Sidgreaves, Stephen Braham, Jeffrey Hoffman, Christopher Carr, Pascal lee, Jose Marmolejo, Jonathan Miller, Ilia Rosenberg, Steven Schwartz; SAE Technical Paper Series; 2003-01-2413; 33rd International Conference on Environmental Systems (ICES) Vancouver, B.C., Canada, Jul. 7-10, 2003; 19 pages.

Investigation of EVA Information Interface Technology in a Mars Analog Arctic Field Science Setting; Michael F. Boucher, Edward Hodgson, Sean K Murray, Pascal Lee, Stephen Braham; SAE Technical Paper Series, 2002-01-2312; 32nd International Conference on Environmental Systems, San Antonio, Texas, Jul. 15-18, 2002; 14 pages.

Pressurized Rover-Based IVA Field Science; Lessons Learned From Moon and Mars Analog Studies at the Haughton-Mars Project, Devon Island, High Artic; Pascal Lee, Stephen Braham, Matthew Deans, Gerrence Fong, Essam Heggy, Mark Helper, Edward Hodgson, Stephen J. Hoffman, John W. Schutt; 42nd Lunar and Planetary Science Conference (2011); 2 pages.

An Advanced EVA System for Planetary Exploration; Edward W. Hodgson Jr. and Tracy L. Guyer, SAE Technical Paper Series, 981630; 28th International Conference on Environmental Systems, Danvers, Massachusetts, Jul. 13-16, 1998; 19 pages.

1960s Hamilton Standard mobility suit.

\* cited by examiner

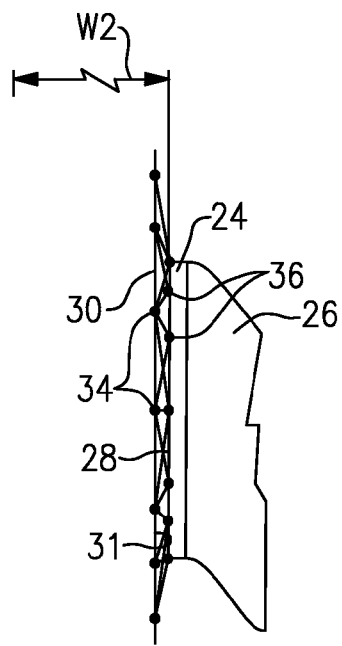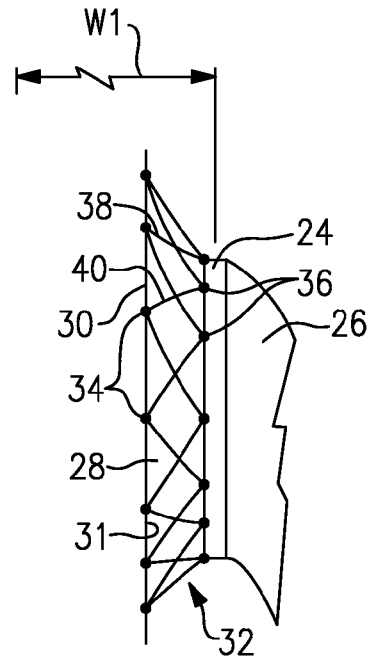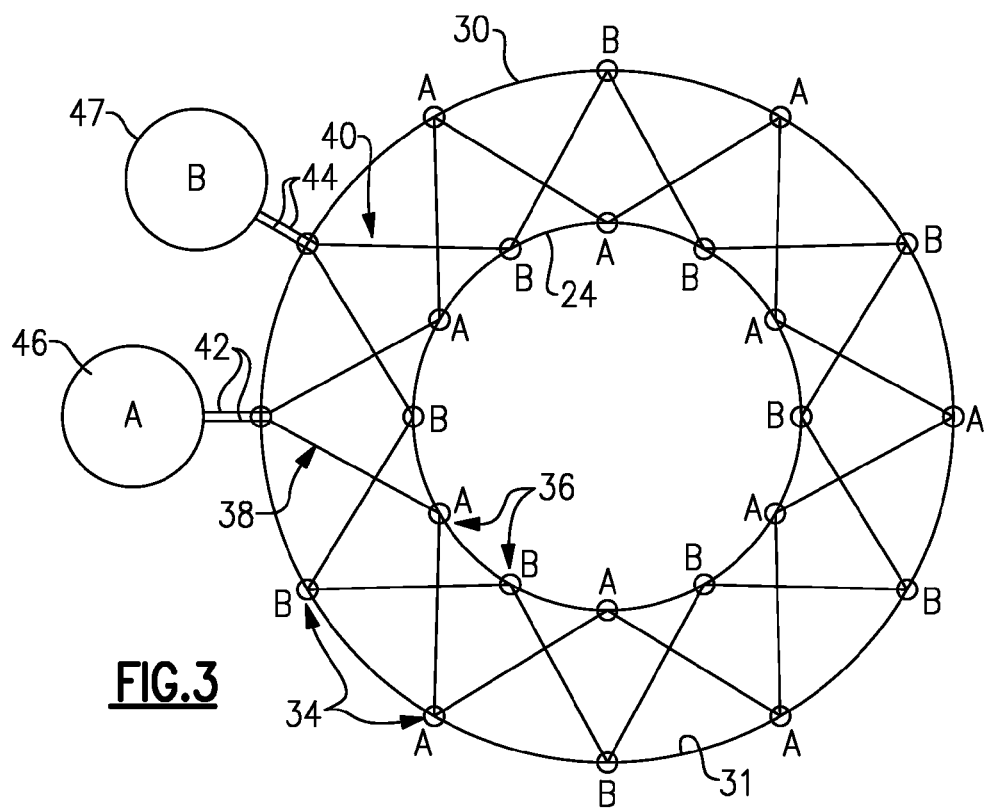

ADJUSTABLE SHOULDER DEVICE FOR HARD UPPER TORSO SUIT

CROSS REFERENCE TO RELATED APPLICATIONS

This application claims priority to U.S. Provisional Application No. 61/474,443 which was filed on Apr. 12, 2011.

BACKGROUND

In extra-vehicular activity (EVA) pressure suit design, it is desirable to properly position a subject with respect to the pressure suit. The suit typically includes bearings that enable sections of the suit to rotate relative to one another. One such bearing is a scye bearing that is provided in each shoulder area of the suit. Proper positioning of the suit relative to the subject is needed to achieve and maintain alignment of subject's joints with the suit's joints for effective mobility and efficient performance of EVA tasks. An inherent conflict exists between this need and the requirement for significant clearance between the suit and body to allow a practical donning process.

Typical NASA design concepts for planetary exploration spacesuits use a rear entry system in which the crew enters the suit through a hatch in the back of a hard (or partially hard) upper torso (HUT). Rear entry spacesuits have a traditional donning problem. For use, the shoulder holes need to be on the sides. With both a hard upper torso and a pressurized soft upper torso, the shoulder holes are typically fixed in one position.

Chest breadth varies from subject to subject. This makes optimal fit from even a limited number of upper torso sizes almost impossible. To further complicate fit, U.S. space programs traditionally carry the conflicting goals of supporting $5^{th}$ percentile Asian female to $95^{th}$ percentile American male subjects yet desiring a minimum inventory of suit sizes or modules.

In the 1960s Hamilton Standard designed and made a mobility suit that was quite flexible through the subject's range of motion. The suit was soft and did not utilize scye bearings. A cord restraint system was provided in the shoulder areas that allowed the shoulder and upper arm to move in any direction or position to be anthropomorphically compliant while pressurized. During that period, Hamilton Standard developed a non-flexing when pressurized cord sizing adjustment system for pressure suit limbs. In this system, areas could be lengthened or shortened by pulling in or letting out the cord.

SUMMARY

A suit includes a hard upper torso providing shoulder apertures. A repositionable scye bearing is arranged at a shoulder aperture. An adjustable shoulder device interconnects the scye bearing and the hard upper torso. The adjustable shoulder device is configured to move the scye bearing between first and second shoulder width positions relative to the hard upper torso.

A method of donning a suit includes the steps of adjusting a scye bearing relative to a hard upper torso to a desired shoulder width position. The desired shoulder width position is maintained.

BRIEF DESCRIPTION OF THE DRAWINGS

The disclosure can be further understood by reference to the following detailed description when considered in connection with the accompanying drawings wherein:

FIG. 2A is a schematic of an adjustable shoulder device at the widest width

FIG. 2B is a schematic of the adjustable shoulder device at the narrowest width.

FIG. 3 is a schematic plan view of the adjustable shoulder dev-ice.

DETAILED DESCRIPTION

Figures 1A, 1B:
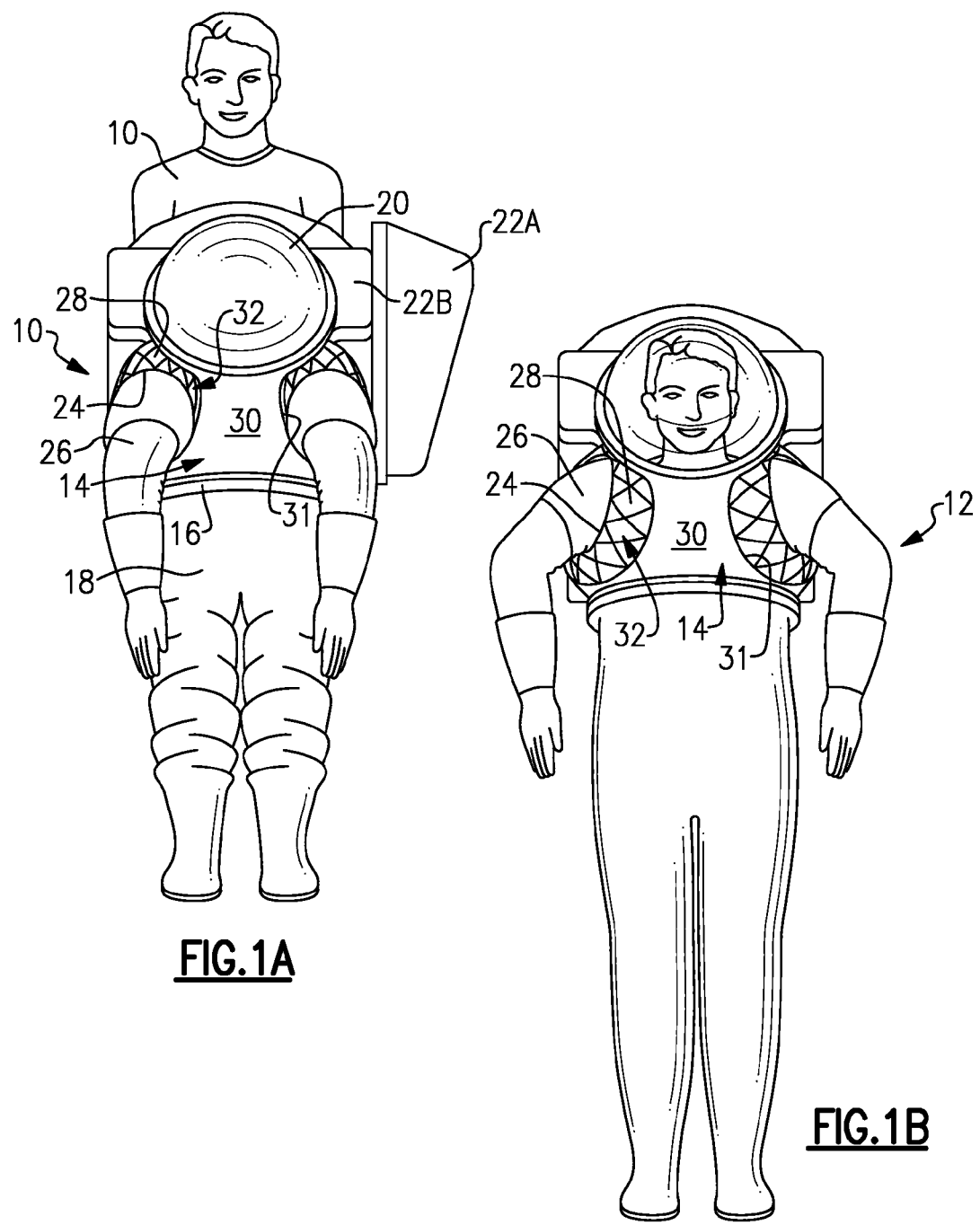
FIG. 1A illustrates a subject donning a suit.
FIG. 1B illustrates the subject with the suit donned.

FIGS. 1A and 1B depict a suit for use in extra vehicular activity for surface missions to asteroids, Mars and other such applications. The example for a subject 10 is of a type having a rear entry system. The suit 12 includes a hard upper torso (HUT) 14 with an optional waist bearing 16. A soft lower torso 18 is connected to the waist bearing 16, in the example shown. The HUT 14 includes a shell 30 that supports a visor 20 and a primary life support system 22A (shown in the open position in FIG. 1A) attached behind entry opening on the rear hatch. Additionally, life support and communication components 22B can be located in protrusions in the HUT 14 ahead of the entry opening but outside the crewmember's entry envelope. Shoulder apertures 31 are provided in the shell 30 at a fixed spacing relative to one another.

The suit 12 has a fabric bellows 28 between the shoulder apertures 31 of the HUT 14 and the scye bearings 24 that are connected to shoulders 26. A redundant cord restraint system 32 provides load bearing structure between the shoulder apertures 31 and the scye bearings 24. The bellows 28 are in-board of the cord restraint system and provide pressure retention between the scye bearing 24 to the shell 30. The bellows 28 and cord restraint system 32 are configured to allow the scye bearing 24 to be moved to an optimal position for placing the subject's arms through the shoulder apertures 31, bellows 28, scye bearings 24, shoulders 26 and arms during donning. The bellows 28 and cord restraint system 32 then permit the scye bearing 24 to be repositioned for optimal crewmember fit and use.

A given HUT 14 must accommodate subjects having differing shoulder widths. To accommodate these differences, the redundant cord restraint system 32 can additionally provide shoulder width adjustment between the scye bearings 24 and the shell 30, as illustrated in FIGS. 2A-3, to move the scye bearing 24 between first (FIG. 2A) and second (FIG. 2B) shoulder width positions W1, W2 relative to the shell 30.

In one example, the adjustable shoulder device 32 includes first anchors 34 secured to the shell 30 and second anchors 36 secured to the scye bearing 24. A first cord 38 interconnects the first and second anchors 34, 36, (at the points labeled "A"), as schematically illustrated in FIG. 3. A second cord 40 is provided between the first and second anchors 34, 36 (at the points labeled "B") to provide redundancy in the event of a failure of the first cord 38. In the example, the first and second cords, 38, 40 are arranged over the bellows 28. The first and second cords 38, 40 are slideable with respect to the first and second anchors 34, 36.

The first cord 38 includes first free ends 42 positioned at a common anchor in the example shown. The first free ends 42 cooperate with a length fixing device 46 that shortens or lengthens the first cord 38 to adjust the shoulder width. A second length fixing device 47 receives second free ends 44 of the second cord 40 for operation in a manner similar to that described relative to the first cord 38. It should be understood that the length fixing devices may only receive one free end of its respective cord, while the other free end may be affixed to a structure, such as the scye bearing 24 or HUT 14.

At least one of the first and second cords 38, 40 are shortened or lengthened to permit the scye bearings 24 to move laterally outward or inward relative to the shoulder aperture 31, as shown in FIGS. 2A and 2B. Hereinafter, only the first cord 38 will be discussed.

A first shoulder width W1, which corresponds to a first length of the cord 38 interconnecting the first and second anchors 34, 36, accommodates subjects with wide shoulders (FIG. 2A). The first cord 38 may be shortened to a second length, which interconnects the first and second anchors 34, 36, to move the scye bearing 24 laterally inward relative to the shoulder aperture 31 and provide a second width W2 that accommodates subjects with narrow shoulders (FIG. 2B).

Figure 4A:
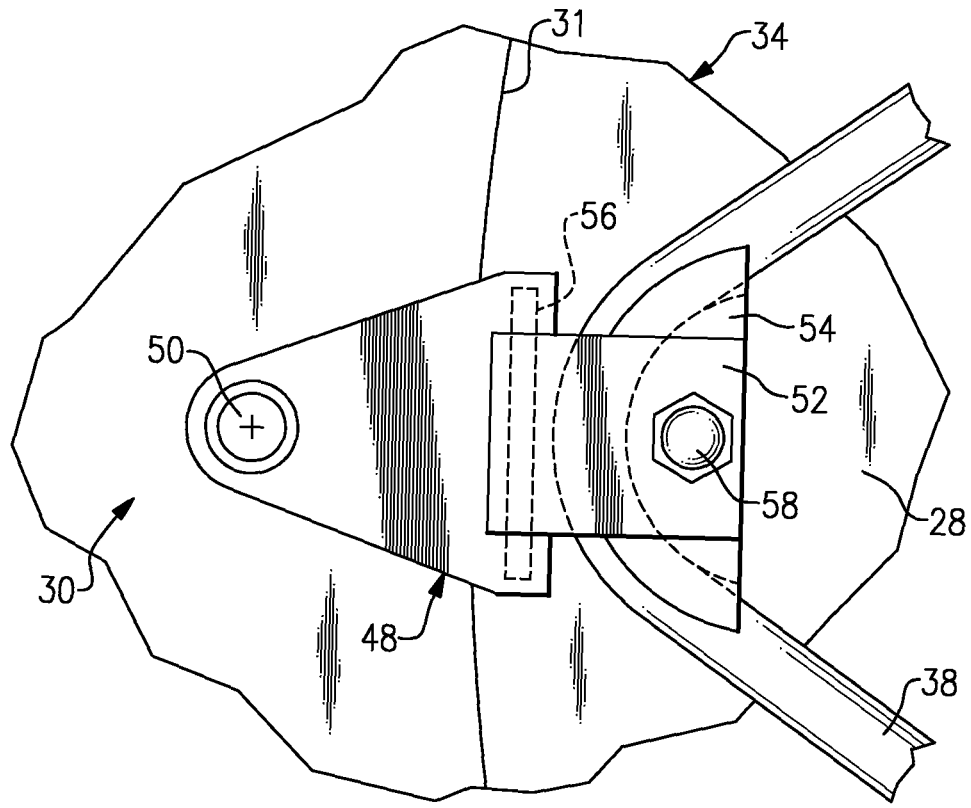
FIG. 4A is a top elevational view of a first anchor secured to a hard upper torso.
Figure 4B:
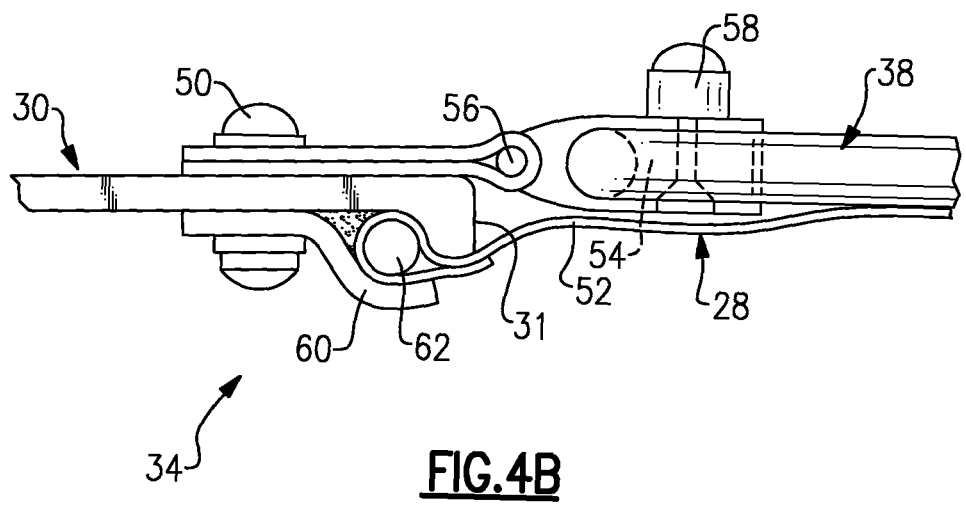
FIG. 4B is a side elevational view of the first anchor illustrated in FIG. 4A.

The first anchors 34 are illustrated in more detail in FIGS. 4A and 4B. A bracket 48 is secured to the shell 30 by a fastener 50. The bellows 28 include a seal 62 that is captured between a clamp 60 and the shell 30. The clamp 60 is secured to the shell 30 by the fastener 50, which is shared by the bracket 48.

An attachment 52 is supported by the bracket 48 with a pivot pin 56, which enables the attachment 52 to articulate relative to the brackets 48 about the pivot pin 56. The attachment 52 carries a slider 54 that slideably supports the first cord 38. The slider 54, which may include a groove that locates and guides the cord 38, is secured to the attachment 52 by fastener 58. One or both of the slider 54 and the cord 38 may be constructed from a low friction material, such as TEFLON, which enables the cord 38 to more easily slide relative to the slider 54.

Figure 5A:
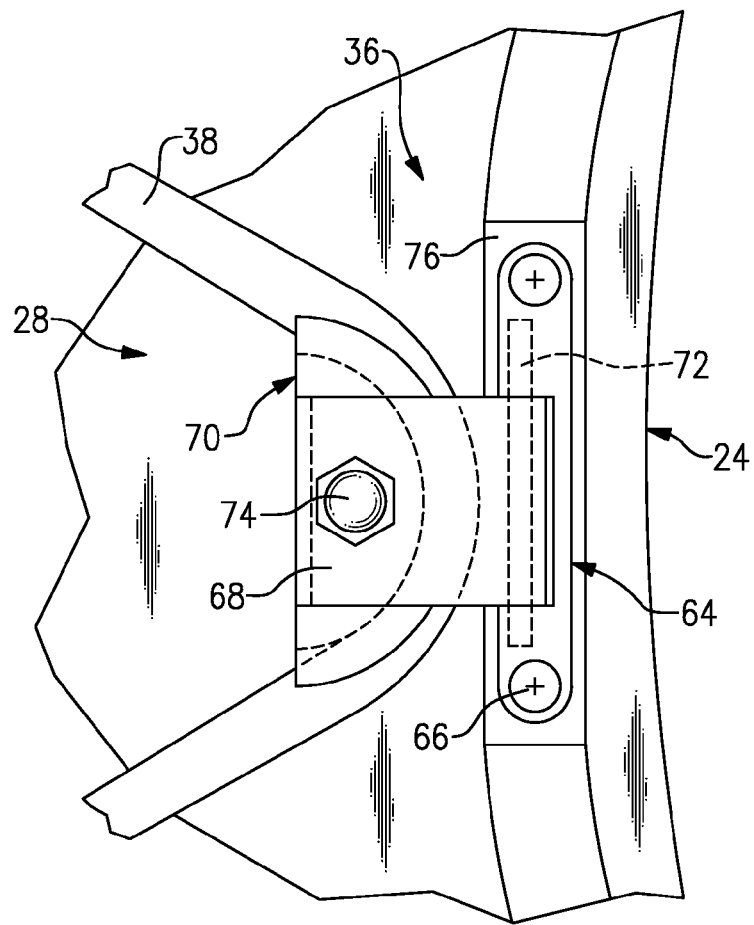
FIG. 5A is a top elevational view of a second anchor secured to a scye bearing.
Figure 5B:
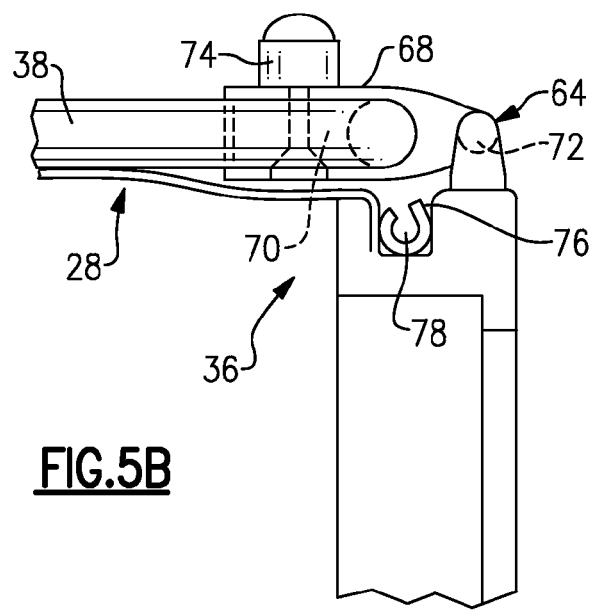
FIG. 5B is a side elevational view of the second anchor.

The second anchors 36 are illustrated in more detail in FIGS. 5A and 5B. A bracket 64 is secured to the shell 30 by a fastener 66. The bellows 28 include a seal 78 that is captured between a clamp 76 and the shell 30. The clamp 76 is secured to the shell 30 by the fastener 66, which is shared by the bracket 64.

An attachment 68 is supported by the bracket 64 with a pivot pin 72, which enables the attachment 68 to articulate relative to the brackets 64 about the pivot pin 72. The attachment 68 carries a slider 70 that slideably supports the first cord 38. The slider 70, which may include a groove that locates and guides the cord 38, is secured to the attachment 68 by fastener 74. One or both of the slider 70 and the cord 38 may be constructed from a low friction material, such as TEFLON, which enables the cord 38 to more easily slide relative to the slider 70.

Figure 6A:
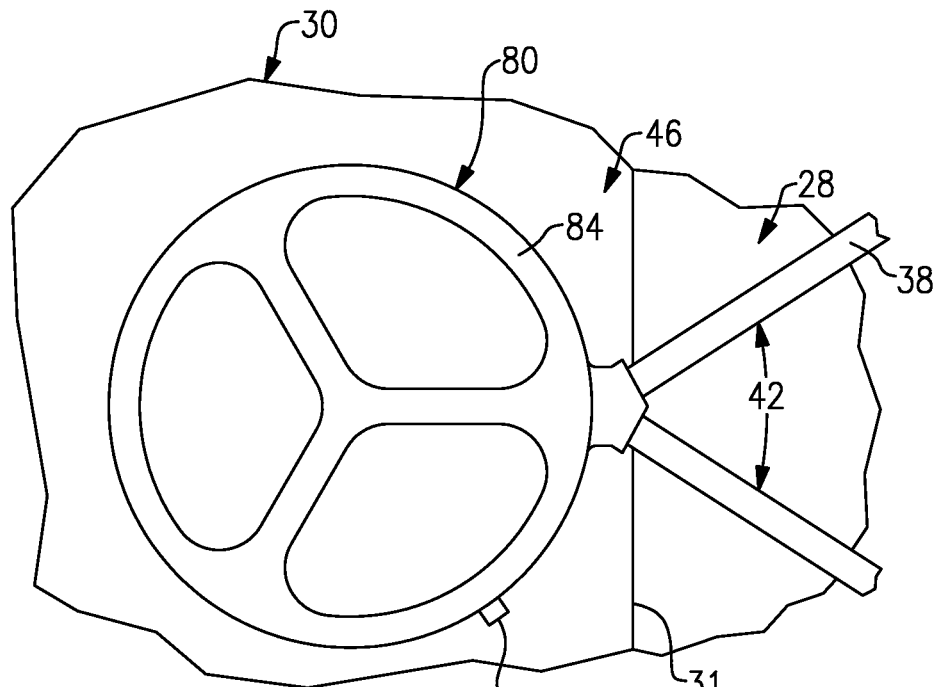
FIG. 6A is a top elevational view of an example length fixing device.
Figure 6B:
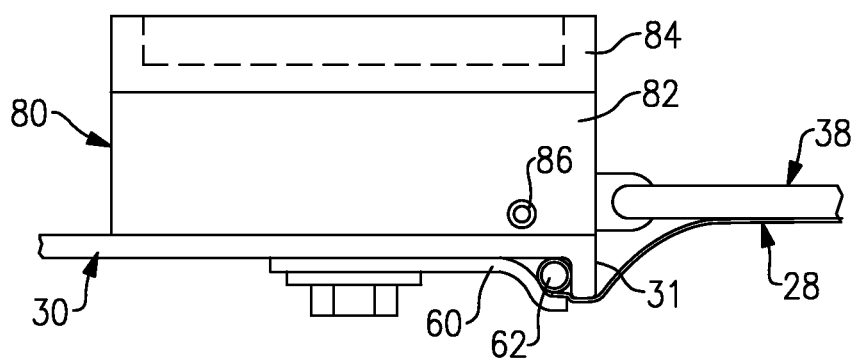
FIG. 6B is a side view of the length fixing device illustrated in FIG. 6A.

The example length fixing device 46 is illustrated in more detail in FIGS. 6A and 6B. The length fixing device 46 include a reel 80 having a base 82 secured to the shell 30. The first free ends 42 of the cords 38 are received by the base 82. One of the first free ends 42 may be fixed while the other of the first free ends 42 may be adjustable to lengthen or shorten the length of the cord 38. The reel 80 includes a knob 84 which is rotatable relative to the base 82 to wind one of the first free ends 42 such that the overall length of the cord 38 interconnecting the first and second anchors 34, 36 may be lengthened or shortened. The length of the cord 38 may be retained by maintaining the adjustment knob 84 in the desired adjusted position using a locking member, such as a set screw 86 in the base 82.

It should be understood that the length fixing device may comprise a simple knot or clip to maintain the desired length of the cord.

In operation, the subject trial-fits the suit 12 and makes adjustments to the scye bearing position relative to the HUT 14 to achieve a desired shoulder width position, which corresponds with desired alignment of the scye bearing 24 relative to the subject's shoulder joint. The desired position is maintained with the locking member so that the cord length cannot be inadvertently shortened or lengthened during use. During subsequent donning of the suit 12, the scye bearings 24 will already be in their desired position for the given subject. Once the suit 12 is on the subject, the primary life support system 22A is arranged over the rear entry opening of the HUT 14 so that the suit 12 may be pressurized.

Although an example embodiment has been disclosed, a worker of ordinary skill in this art would recognize that certain modifications would come within the scope of the claims. For that reason, the following claims should be studied to determine their true scope and content.

What is claimed is:

1. A suit comprising:
   a hard upper torso providing shoulder apertures;
   a repositionable scye bearing arranged at one of the shoulder apertures; and
   an adjustable shoulder device interconnecting the scye bearing and the hard upper torso and configured to move the scye bearing between first and second shoulder width positions relative to the hard upper torso;
   wherein the adjustable shoulder device includes first and second anchors respectively mounted on the hard upper torso and the scye bearing, and an adjustable cord interconnected between the first and second anchors and configured to move the scye bearing between the first and second shoulder width positions;
   a second adjustable shoulder device including a second set of first and second anchors respectively mounted on the hard upper torso and the scye bearing, and a second adjustable cord interconnected between the second set of first and second anchors and configured to move the scye bearing between the first and second shoulder width positions; and
   wherein at least one of the first and second anchors includes an attachment rotatable secured to a bracket by a pivot pin, and a slider carried by the attachment, the cord slideable relative to the slider.

2. A suit comprising:
   a hard upper torso providing shoulder apertures;
   a repositionable scye bearing arranged at one of the shoulder apertures;
   an adjustable shoulder device interconnecting the scye bearing and the hard upper torso and configured to move the scye bearing between first and second shoulder width positions relative to the hard upper torso; and
   a bellows interconnecting the scye bearing and the hard upper torso, the bellows include a seal, a clamp retaining the seal to one of the hard upper torso or the scye bearing, and a fastener securing a bracket and the clamp to the one of the hard upper torso or the scye bearing.

3. The suit according to claim 2, the hard upper torso providing a rear entry opening.

4. The suit according to claim 2, wherein the bellows sealingly interconnects the scye bearing and the hard upper torso, the adjustable shoulder device arranged over the bellows.

5. The suit according to claim 2, wherein the adjustable shoulder device includes first and second anchors respectively mounted on the hard upper torso and the scye bearing, and an adjustable cord interconnected between the first and second anchors and configured to move the scye bearing between the first and second shoulder width positions.

6. The suit according to claim 5, comprising a second adjustable shoulder device including a second set of first and second anchors respectively mounted on the hard upper torso and the scye bearing, and a second adjustable cord interconnected between the second set of first and second anchors and configured to move the scye bearing between the first and second shoulder width positions.

7. The suit according to claim 2, the hard upper torso providing a rear entry opening.

8. The suit according to claim 2, comprising a bellows sealingly interconnecting the scye bearing and the hard upper torso, the adjustable shoulder device arranged over the bellows.

9. A suit comprising:
a hard upper torso providing shoulder apertures;
a repositionable scye bearing arranged at one of the shoulder apertures; and
an adjustable shoulder device interconnecting the scye bearing and the hard upper torso and configured to move the scye bearing between first and second shoulder width positions relative to the hard upper torso;
wherein the adjustable shoulder device includes first and second anchors respectively mounted on the hard upper torso and the scye bearing, and an adjustable cord interconnected between the first and second anchors and configured to move the scye bearing between the first and second shoulder width positions;
a second adjustable shoulder device including a second set of first and second anchors respectively mounted on the hard upper torso and the scye bearing, and a second adjustable cord interconnected between the second set of first and second anchors and configured to move the scye bearing between the first and second shoulder width positions; and
wherein the first shoulder width position corresponds to a first length of cord between the first and second anchors, and the second shoulder width position corresponds to a second length of cord between the first and second anchors, the first and second lengths different than one another;
wherein the adjustable shoulder device includes a length fixing device configured to retain one of the first and second lengths; and
wherein the length fixing device includes a reel receiving at least one free end of the cord, the reel configured to wind and unwind the cord to adjust a cord length, and a locking member configured to maintain the adjusted cord length.

10. The suit according to claim 9, the hard upper torso providing a rear entry opening.

11. The suit according to claim 9, comprising a bellows sealingly interconnecting the scye bearing and the hard upper torso, the adjustable shoulder device arranged over the bellows.

\* \* \* \* \*